United States Patent [19]

Peiffer et al.

[11] Patent Number: 5,372,882

[45] Date of Patent: * Dec. 13, 1994

[54] BIAXIALLY ORIENTED, MULTILAYER POLYOLEFIN FILM OF HIGH SHRINKAGE WHICH CAN BE HEAT-SEALED AT LOW TEMPERATURES

[75] Inventors: Herbert Peiffer, Mainz-Finthen; Ursula Murschall, Nierstein, both of Germany

[73] Assignee: Hoechst Aktiengesellschaft, Frankfurt am Main, Germany

[ * ] Notice: The portion of the term of this patent subsequent to Mar. 8, 2011 has been disclaimed.

[21] Appl. No.: 87,336

[22] Filed: Jul. 8, 1993

[30] Foreign Application Priority Data

Jul. 10, 1992 [DE] Germany .............................. 4222740

[51] Int. Cl.$^5$ ........................................... B65B 53/00
[52] U.S. Cl. ................................... 428/34.9; 428/500; 428/349; 428/516; 428/910
[58] Field of Search ............... 428/516, 500, 349, 910, 428/34.9

[56] References Cited

U.S. PATENT DOCUMENTS 5,212,009 5/1993 Peiffer et al. ...................... 428/220
5,234,733 8/1993 Schloegl et al. ................. 428/36.91

FOREIGN PATENT DOCUMENTS 0340579 11/1989 European Pat. Off. .
0400456 12/1990 European Pat. Off. .
0481344 10/1991 European Pat. Off. .
2055688 3/1981 United Kingdom .
2115348 9/1983 United Kingdom .

Primary Examiner—Edith Buffalow
Attorney, Agent, or Firm—Foley & Lardner

[57] ABSTRACT

A transparent, coextruded, multilayer polyolefin film which can be heat-sealed at low temperatures and comprises a base layer and at least one top layer applied on one side. The multilayer film has, at 120° C., a longitudinal shrinkage of greater than about 10%, preferably from about 15% to about 35%, and a transverse shrinkage of greater than about 10%, preferably from about 15% to about 35%. The multilayer film has, at 90° C., a longitudinal shrinkage of at most about 10%, preferably from about 3% to about 8%, and a transverse shrinkage of at most about 10%, preferably from about 2% to about 8%. The top layers have a minimum sealing temperature of at most about 124° C., preferably from about 75° C. to about 110° C. The film is useful as a packaging film.

18 Claims, No Drawings

BIAXIALLY ORIENTED, MULTILAYER POLYOLEFIN FILM OF HIGH SHRINKAGE WHICH CAN BE HEAT-SEALED AT LOW TEMPERATURES

BACKGROUND OF THE INVENTION

1. Field of the Invention

The present invention relates to a transparent coextruded, multilayer polyolefin film which can be heat-sealed at low temperatures, comprising a base layer and at least one top layer applied on one side. The multilayer film is distinguished by high shrinkage in the longitudinal and transverse directions in combination with excellent optical properties and smooth passage through a packaging machine. The invention furthermore relates to a process for the production of a film of this type and to the use of the film.

2. Description of Related Art

Various types of shrink films are known from the prior art and are widely used as packaging films. Shrink packaging is usually produced starting from a pouch, into which the goods are introduced, followed by separation/welding and subsequent shrinkage in a shrink oven. In this way, very tight, fold-free film packaging is obtained, as is particularly desirable in many cases. In order that this tight wrap is reliably achieved, the films used must have high shrinkage values, since the film wrapping after separation/welding surrounds the contents relatively loosely. This is due to the fact that the welding wire cannot be moved right up against the packaged goods. High shrinkage values of the films are therefore a prerequisite for their use as conventional shrink packaging. Such films are described, for example, in EP-A-0 436 196, DE-A-19 54 467, DE-A-32 15 120, and EP-A-0 350 859.

Various types of heat-sealable films are likewise widespread and generally used as packaging materials. The heat-sealability of the material enables packaging of goods on high-speed packaging machines, which enables considerable cost advantages to be achieved.

Heat-sealable, biaxially oriented, multilayer polyolefin films in which the base layer comprises propylene homopolymers and the heat-sealable layer(s) (outer layer(s) or top layer(s)) comprises heat-sealable olefin polymers are described in numerous publications, for example, EP-A-0 194 588, EP-A-0 008 904, and U.S. Pat. No. 4,419,411. These multilayer polyolefin films have important properties for packaging films, namely a broad heat-sealing range, good heat-sealability, relatively high scratch resistance, low friction and thus good running properties on high-speed packaging machines of various types.

The heat-sealable films described are generally produced so that they are as dimensionally stable as possible, i.e., these films have the lowest possible shrinkage in the longitudinal and transverse directions. In general, packaging films of this type exhibit shrinkage values at 120° C. of less than 5% in the longitudinal direction and less than 4% in the transverse direction. The prevailing opinion hitherto was that films having these low shrinkage values give a visually attractive wrap. In fact, however, the packages are wrapped in a loose or bloused manner and have folds and billows at the edges and are therefore unsuitable for goods in which particularly tight packaging is required.

In the search for heat-sealable shrink films it has been found that conventional shrink films are unsuitable for a heat-sealable shrink film. Although coating of known highly shrinkable films with a heat-sealable layer enables them to be used in packaging machines, the pronounced shrink properties, which ensure the desired tightness of the packaging, also cause the seal seams to shrink so much that the visual appearance of the packaging is changed in an unacceptable manner.

EP-A-489 373 discloses heat-sealable shrink films built up from a polypropylene (PP) homopolymer base layer and ethylene/propylene copolymer top layers. These films have increased shrinkage compared with conventional heat-sealable packaging films, but the shrink properties are inadequate if tight coverings are required.

SUMMARY OF THE INVENTION

The object of the present invention was to provide a biaxially oriented, heat-sealable, multilayer polyolefin film which has excellent optical properties including low film haze and high surface gloss and runs smoothly through the packaging machine, gives a tight, attractive, billow- and fold-free wrap appearance and has good to very good shrink properties. At the same time, these shrink properties must be optimized to give a visually perfect seal seam, which must not be impaired by the shrinkage.

A further object of the invention was to provide a method for producing such a film and to provide methods of using such a film, for example, as packaging films.

In accomplishing the foregoing objectives, there has been provided, in accordance with one aspect of the present invention, a transparent, coextruded, multilayer polyolefin film which can be heat-sealed at low temperatures, comprising a base layer and at least one heat-sealable top layer on the base layer, wherein a) the multilayer film has, at 120° C., a longitudinal shrinkage of greater than 10%, and a transverse shrinkage of greater than 10%;

b) the multilayer film has, at 90° C., a longitudinal shrinkage of at most 10%, and a transverse shrinkage of at most 10%; and c) at least one top layer has a minimum sealing temperature of at most 124° C.

In accordance with another aspect of the invention there is provided a method for producing this film comprising the steps of:

a) producing a prefilm by coextrusion in a flat film die, b) solidifying the prefilm on a chill roll, and c) orienting the solidified film in the longitudinal and transverse direction by stretching, wherein the longitudinal stretching is preferably carried out at a temperature of less than 130° C. and at a preferred stretching ratio of from about 4:1 to about 9:1.

Further objects, features, and advantages of the present invention will become apparent from the detailed description of preferred embodiments which follows.

DETAILED DESCRIPTION OF THE PREFERRED EMBODIMENTS

Surprisingly, it has been found that a film having a longitudinal shrinkage of greater than about 10% at 120° C., preferably from about 15% to about 35%, in particular from about 20% to about 25%, and an increased transverse shrinkage of greater than about 10% at 120° C., preferably from about 15% to about 35%, gives visually perfect seal seams compared with the known films of the prior art. The seams are excellent in spite of their high shrinkage capacity, since the shrinkage is quite low at temperatures in the region of the minimum sealing temperature as compared with the shrinkage behavior at 120° C. At the same time, the films give a significantly tighter, fold- and billow-free wrap appearance than conventional films due to the greatly increasing shrinkage at elevated temperature. The tight, fold- and billow-free wrap in combination with visually perfect seal seams, the low film haze and the high surface gloss ensures packaging having a significantly more attractive, brighter appearance.

The base layer and top layer(s) may contain any desired polyolefins so long as the parameters set forth above are maintained. In particular, the base layer of the multilayer film according to the invention generally comprises a homopolymer, copolymer, or terpolymer of α-olefins having 2 to 8 carbon atoms, in particular, a homopolymer, copolymer, or terpolymer of propylene, or a mixture or blend of said polymers. Preferred α-olefinic copolymers or terpolymers are copolymers comprising ethylene and propylene, ethylene and butylene, or propylene and butylene units or terpolymers of propylene. Particular preference is given to ethylene-propylene copolymers having an ethylene content of about 10% by weight or less and ethylene-propylene-butylene terpolymers having an ethylene content of from about 1% to about 7% by weight, a butylene content of from about 4% to about 10% by weight and a propylene content of from about 83% to about 95% by weight. The data in percent by weight are based on the respective copolymer or terpolymer. In general the base layer comprises at least about 75% by weight, preferably at least about 90% by weight, each time based on the weight of the base layer, of the afore-mentioned propylene homo-, propylene co- or propylene terpolymer or mixtures or blends thereof.

Furthermore, mixtures of two or more of the above-mentioned olefinic polymers are particularly suitable. Particular preference is given to mixtures of propylene copolymers, preferably ethylene-propylene copolymers, and propylene terpolymers, and mixtures of propylene copolymers or propylene terpolymers with propylene homopolymers. Particular preference is given to mixtures of ethylene-propylene copolymers, with ethylene-propylene-butylene terpolymers or of ethylene-propylene copolymers with PP homopolymers or of ethylene-propylene-butylene terpolymers with PP homopolymers. In the particularly preferred mixtures containing PP homopolymers, said copolymers and/or terpolymers preferably form the major constituents, making up at least about 50% by weight, preferably from about 60% to about 98% by weight, based on the total mixture. Correspondingly, the PP homopolymer content of the mixtures is generally present in a maximum of about 50% by weight, preferably in the range from about 2.0% to about 40% by weight, in each case based on the total mixture. For three-component mixtures which contain both copolymers and terpolymers, the mixing ratios of the copolymers or terpolymers may vary within broad limits.

The propylene homopolymer which may be present as a mixture component in the base layer preferably contains at least about 90% propylene and has a melting point of about 140° C. or above, preferably from about 150° C. to about 170° C. Isotactic homopolypropylene having an n-heptane-soluble content of 6% by weight or less, based on the homopolymer, is particularly preferred. The melt flow index of the PP homopolymer is generally in the range of about 0.5 g/10 to about 8 g/10 min, preferably from about 2 g/10 to about 5 g/10 min (DIN 53 735).

The copolymers and/or terpolymers present in the mixture of the base layer preferably have a melting point in the range from about 100° C. to about 150° C., preferably from about 120° to about 135° C., and a melt flow index in the range from 0.5 g/10 to 10 g/10 min, preferably from about 2 g/10 to about 8 g/10 min (DIN 53 735).

The top layer(s) of the multilayer film according to the invention generally comprise(s) an α-olefin polymer which can be heat-sealed at low temperatures. Any heat-sealable α-olefin polymer can be used. Preference is given to terpolymers of ethylene and propylene and butylene or ethylene and propylene and another α-olefin having 5 to 10 carbon atoms. Preference is likewise given to mixtures of two or more of said terpolymers and mixtures of one or more of said terpolymers and one or more copolymers of α-olefins having 2 to 10 carbon atoms.

The top layer preferably comprises ethylene-propylene-butylene terpolymer or a mixture of this terpolymer with one or more copolymers comprising ethylene and propylene or ethylene and butylene or propylene and butylene units.

Particularly useful polymers for the top layer include random ethylene-propylene copolymers having an ethylene content of from about 2% to about 10% by weight, preferably from about 5% to about 8% by weight, or random propylene-butylene copolymers having a butylene content of from about 4% to about 25% by weight, in particular from about 10% to about 20% by weight. Very particular preference is given to an ethylene-propylene-butylene terpolymer having an ethylene content of from about 1% to about 10% by weight, in particular from about 2% to about 6% by weight, and a butylene content of from about 3% to about 20% by weight, in particular from about 8% to about 10% by weight, or a mixture of an ethylene-propylene-butylene terpolymer and a propylene-butylene copolymer having an ethylene content of from about 0.1% to about 7% by weight, a propylene content of from about 50% to about 90% by weight and a butylene content of from about 10% to about 40% by weight, in each case based on the total weight of the mixture.

The melt flow index of the polymer or polymer mixture of the top layer(s) is generally from about 0.5 g/10 to about 10 g/10 min, preferably from about 2 g/10 to about 8 g/10 min. The melting range of the polymers of the top layer is generally from about 100° C. to about 150° C., preferably from about 120° C. to about 135° C.

It is essential to the invention that the minimum sealing temperature of the top layer polymer is low, in particular below about 124° C. Otherwise, the elevated temperature during sealing simultaneously causes initiation of considerable shrinkage, which results in undesired shrinkage of the seal seam. Preference is given to a top layer material having a minimum sealing temperature of from about 75° C. to about 110° C., in particular from about 80° C. to about 105° C.

It has been found that the film only satisfies the requirements set forth at the outset if the low minimum sealing temperature is achieved in combination with the specific shrink properties. The achievement of low shrinkage at low temperatures (90° C.) and increased shrinkage at elevated temperatures (120° C.) surprisingly makes possible the desired tight appearance of the packaging and simultaneously sealing in which there is no impairment of the seal seams. Surprisingly, it has thus been found to be possible to produce a heat-sealable and shrinkable film which as packaging satisfies visual demands in an outstanding manner.

It has furthermore proven particularly advantageous to add a low-molecular-weight resin, generally in a proportion of from about 1% to about 30% by weight, preferably from about 2% to about 10% by weight, relative to the base layer. The softening point of the resin is generally between about 100° C. and about 180° C. (measured in accordance with DIN 1995-U4, corresponding to ASTM E-28), preferably above 120° C. Of the numerous low-molecular-weight resins, hydrocarbon resins are preferred, in particular, those in the form of petroleum resins, styrene resins, cyclopentadiene resins and terpene resins (these resins are described in *Ullmanns Encyklopadie der techn. Chemie* [*Ullmann's Encyclopedia of Industrial Chemistry*], 4th Edition, Volume 12, pages 525–555).

The petroleum resins are such hydrocarbon resins prepared by polymerization of deep-decomposed petroleum materials in the presence of a catalyst. These petroleum materials usually contain a mixture of resin-forming substances, such as styrene, methylstyrene, vinyltoluene, indene, methylindene, butadiene, isoprene, piperylene and pentylene. The styrene resins are low-molecular-weight homopolymers of styrene or copolymers of styrene with other monomers, such as methylstyrene, vinyltoluene and butadiene. Cyclopentadiene resins are cyclopentadiene homopolymers or cyclopentadiene copolymers obtained from coal tar distillates and decomposed petroleum gas. These resins are prepared by keeping the materials containing the cyclopentadiene at elevated temperature for an extended period. Depending on the reaction temperature, dimers, trimers or oligomers can be obtained.

The terpene resins are polymers of terpenes, i.e., hydrocarbons having the formula $C_{10}H_{16}$, which are present in virtually all ethereal oils or oil-containing resins from plants, and phenol-modified terpene resins. Specific examples of terpenes which may be mentioned are pinene, α-pinene, dipentene, limonene, myrcene, camphene and similar terpenes. The hydrocarbon resins can also be so-called modified hydrocarbon resins. The modification is generally carried out by reacting the raw materials before polymerization, by introduction of specific monomers or by reaction of the polymerized product, in particular hydrogenations or partial hydrogenations being carried out.

Other hydrocarbon resins which can be employed include styrene homopolymers, styrene copolymers, cyclopentadiene homopolymers, cyclopentadiene copolymers and/or terpene polymers, each having a softening point of above 100° C. (in the case of unsaturated polymers, the hydrogenated product is preferred). Very particular preference is given to the use in the base layer of cyclopentadiene polymers having a softening point of 120° C. or above.

In addition to these preferred additives, the base layer may also contain further conventional additives in effective amounts in each case.

The multilayer film according to the invention comprises at least the base layer and at least one top layer. Preferred embodiments comprise three layers with identical or different top layers applied to both sides.

The overall thickness of the film depends on its intended application and can vary within broad limits. It is preferably in the range from about 10 μm to about 40 μm. The thickness of the top layer can vary depending on intended use and is preferably from about 0.1 μm to 4 μm, more preferably from about 0.5 μm to about 2 μm.

In order to further improve certain properties of the polypropylene film according to the invention, both the base layer and the top layer(s) may contain additives in an effective amount. Such additives include antistatics and/or antiblocking agents and/or lubricants and/or stabilizers and/or neutralizers which are compatible with the polymers of the core layer and the top layers. All amount data below in percent by weight are based on the layer or layers to which the additives can be added.

Preferred antistatics are alkali metal alkanesulfonates, polyether-modified, i.e., ethoxylated and/or propoxylated, polydiorganosiloxanes (polydialkylsiloxanes, potyalkylphenylsiloxanes and the like) and/or essentially straight-chain or saturated, aliphatic, tertiary amines containing an aliphatic radical having 10 to 20 carbon atoms which are substituted by ω-hydroxy-($C_1$-$C_4$)-alkyl groups. N,N-bis(2-hydroxyethyl)alkylamines having 10 to 20 carbon atoms, preferably 12 to 18 carbon atoms, in the alkyl radical are particularly suitable. Furthermore, glycerol monostearate is a preferred antistatic. The effective amount of antistatic is generally in the range from about 0.05% to about 0.3% by weight.

Useful lubricants include higher aliphatic acid amides, higher aliphatic acid esters, waxes and metal soaps and polydimethylsiloxanes. The effective amount of lubricant is generally in the range from about 0.01% to about 3% by weight. The addition of higher aliphatic acid amides in the range from 0.05% to 0.25% by weight in the base layer and/or top layers is particularly suitable. A particularly suitable aliphatic acid amide is erucamide. The addition of polydimethyl-siloxanes is preferred in the range from about 0.1% to about 2% by weight. In particular polydimethylsiloxanes having a viscosity of from 10,000 $mm^2/s$ to 1,000,000 $mm^2/s$ is preferred.

Stabilizers which can be employed are the conventional stabilizing compounds for ethylene, propylene and other α-olefin polymers. The amount of these compounds added is generally between about 0.05% and about 2% by weight. Phenolic stabilizers, alkali metal-/alkaline earth metal stearates and/or alkali metal/alkaline earth metal carbonates are particularly suitable. Phenolic stabilizers are preferred in an amount of from about 0.1% to about 0.6% by weight, in particular from 0.15% to 0.3% by weight, and having a molecular weight of greater than 500 g/mol. Pentaerythrityl tetrakis 3-(3,5-di-t-butyl-4-hydroxyphenyl)propionate and 1,3,5-trimethyl-2,4,6-tris(3,5-di-t-butyl-4-hydroxybenzyl)benzene are particularly advantageous.

Suitable antiblocking agents include inorganic additives such as silicon dioxide, calcium carbonate, magnesium silicate, aluminum silicate, calcium phosphate and the like and/or incompatible organic polymers such as polyamides, polyesters, polycarbonates and the like; preference is given to benzoguanamine-formaldehyde polymers, silicon dioxide and calcium carbonate. The effective amount of antiblocking agent is generally in the range from about 0.05% to about 2% by weight, preferably from 0.1% to 0.5% by weight. The mean particle size is generally between about 1 μm and about 6 μm, in particular between 2 μm and 5 μm, the particles having a spherical shape, as described in EP-A-0 236 945 and DE-A-38 01 535, are particularly suitable.

Neutralizers are preferably calcium stearate and/or calcium carbonate having a mean particle size of at most 0.7 μm, an absolute particle size of less than 10 μm and a specific surface area of at least 40 m²/g.

The invention furthermore relates to a process for the production of the multilayer film according to the invention. Any process which will give film having the desired characteristics can be used, for example, the coextrusion process, which is known per se is especially useful. This process is carried out by coextruding the melts corresponding to the individual layers of the film through a flat-film die, taking off the resultant film on one or more rolls for solidification, subsequently biaxially stretching (orienting) the film, thermo-fixing the biaxially stretched film and, if appropriate, corona-shrinking the surface layer intended for corona treatment.

The biaxial stretching (orientation) can be carried out simultaneously or successively, preference being given to successive biaxial stretching, in which stretching is first carried out longitudinally (in the machine direction) and then transversely (perpendicular to the machine direction). The stretching conditions are preferably selected so that the film is oriented in as balanced a way as possible, i.e., has virtually isotropic properties.

As is usual in the coextrusion process, first the polymer or polymer mixture of the individual layers is compressed and liquefied in an extruder, it being possible for any additives already to be present in the polymer. The melts are then simultaneously forced through a flat-film die (flop die) and the multilayer film extruded is taken off on one or more take-off rolls, where it cools and solidifies.

The film obtained in this way is then stretched longitudinally and transversely to the extrusion direction, which results in orientation of the molecular chains. The stretching in the longitudinal direction is preferably from about 4:1 to about 9:1 and in the transverse direction preferably from about 6:1 to about 10:1. Longitudinal stretching is expediently carried out with the aid of two rolls running at different speeds in accordance with the desired stretching ratio, and the transverse stretching is carried out with the aid of a suitable tenter frame. The film is expediently not highly stretched in the transverse direction. Generally, in order to achieve the shrink properties essential to the invention, a transverse/longitudinal stretching ratio of less than about 2, preferably less than about 1.5, should be observed. This ratio is particularly preferably in the range from about 0.5 to about 1.5.

The biaxial stretching of the film is preferably followed by thermo-fixing (heat treatment) thereof, in which the film is generally kept at a temperature of from about 60° C. to about 130° C., preferably from about 80° C. to about 120° C., for from about 0.1 second to about 10 seconds. The film is subsequently wound up in a conventional manner using a wind-up device.

It has proven particularly suitable to keep the takeoff roll or rolls, by means of which the extruded film is also cooled and solidified, at a temperature of from about 10° C. to about 90° C., preferably from about 20° C. to about 60° C. In addition, the longitudinal stretching is advantageously carried out at a temperature of less than about 130° C., preferably in the range from about 80° C. to about 120° C., and the transverse stretching at a temperature of greater than about 110° C., preferably from about 130° C. to about 155° C.

If appropriate, the biaxial stretching can be followed by corona or flame treatment of one or both surfaces of the film by one of the known methods.

In the case of corona treatment, the film is passed between two conductor elements serving as electrodes, with a sufficiently high voltage, usually alternating voltage of about 10,000 V and 10,000 Hz, being applied between the electrodes so that spray or corona discharge can take place. The spray or corona discharge ionizes the air above the film surface and reacts with the molecules of the film surface, causing polar inclusions to form in the essentially non-polar polymer matrix. The treatment intensities are within conventional limits, preferably from about 38 mN/m to about 45 mN/m.

In the case of flame treatment, the film is passed over a chill roll above which a gas burner is arranged. The film is pressed firmly against the chill roll by a nip roll. The gas flowing out of the burner is ignited and forms flames about 5 mm to 10 mm in length. The oxidizing part of the flame hits the film surface and ensures an increase in the surface energy of the film. This, too, is within conventional limits.

The multilayer film according to the invention has a combination of properties which make it particularly suitable for its intended application as a heat-sealable and shrinkable packaging film.

The excellent shrink properties ensure a tight, fold- and billow-free wrap appearance of the packaging, but, surprisingly, the seal seams are in no way impaired visually. At the same time, the film satisfies all the other requirements made of packaging materials. The shrink film is readily processed on high-speed packaging machines. It has excellent transparency and excellent gloss. In addition, the film can, in particular after corona or flame treatment, be printed extremely well or metallized or laminated. The film according to the invention is thus highly suitable for its intended application as a packaging film, in particular as film packaging for bakery products, but also for video and audio cassettes.

For characterization of the raw materials and films in the following example, the following measurement methods were used, in addition to those mentioned above:

Melt flow index
DIN 53 735 at a load of 21.6 N and at 230° C.
Melting point
DSC measurement, maximum of melting curve, heating rate 20° C./min.
Haze The film haze is measured in accordance with ASTM-D 1003–52, using a 1° slit diaphragm instead of a 4° pinhole diaphragm, and the haze is given in percent for four film layers lying one on top of the other. The four layers were selected since this utilizes the optimum measurement range. Haze assessment was carried out using:

| | | |
|---|---|---|
| ≦20% | = | very good (++) |
| >20% to 25% | = | good (+) |
| ≧25% to 30% | = | moderate (±) |
| ≧30% | = | poor (−) |

Gloss

The gloss is determined in accordance with DIN 67 530.

The reflector value is measured as an optical parameter for the surface of a film. In accordance with the standards ASTM-D 523-78 and ISO 2813, the angle of incidence was set at 20°. The light beam hits the planar test surface at the set angle of incidence and is reflected or scattered thereby. The light beams incident on the photoelectronic receiver are indicated as a proportional electrical quantity. The reference value is dimensionless and must be specified together with the angle of incidence. The gloss assessment (angle of incidence 20°) is carried out using:

| | | |
|---|---|---|
| $\geq 100$ | = | very good (++) |
| $\leq 90$ to $100$ | = | good (+) |
| $\leq 80$ to $90$ | = | moderate (±) |
| $< 80$ | = | poor (−) |

Scratch resistance or scratch sensitivity

The scratch resistance is determined in accordance with DIN 53 754.

The scratch resistance is determined using a Taber model 503 abraset from Teledyne Taber, fitted with abrasion wheels of the Calibrade R H18 brand with a weight of 250 g. Scratch resistance or scratch sensitivity is taken to mean the increase in haze of the scratched film compared with the original film after 50 revolutions of the sample disk. The scratch resistance is very good (++) if the increase in haze is less than 22%, good (+) if the increase in haze is from 22 to 25%, moderate (±) if the increase in haze is from 25 to 30%, and poor (−) if the increase in haze is greater than 30%.

Determination of the seal seam strength

Two film strips 15 mm in width are laid one on top of the other and sealed together at 105° C. for a sealing time of 0.5 second and a sealing pressure of 10 N/cm² (instrument: Brugger type NDS, sealing jaws heated on one side). The seal seam strength is determined by the T-peel method.

Determination of the minimum sealing temperature

Heat-sealed samples (seal seam 20 mm × 100 mm) are produced using the Brugger HSG/ET sealing unit by sealing a film at different temperatures with the aid of two heated sealing jaws at a sealing pressure of 10 N/cm² and a sealing time of 0.5 second. Test strips with a width of 15 mm are cut out of the sealed samples. The T-seal seam strength, i.e., the force necessary to separate the test strips, is determined using a tensile tester at a peel rate of 200 mm/min, the seal seam plane forming a right angle to the tension direction. The minimum sealing temperature is the temperature at which a seal seam strength of at least 0.5 N/15 mm is achieved.

Determination of the corona-treatment intensity

The corona treatment was carried out so that the treated film surface in each case had a treatment intensity of preferably from 38 mN/m to 41 mN/m directly after the treatment. The treatment intensity was determined by means of the so-called ink method (DIN 53 364).

Long-term treatment intensity

The treatment intensity measurement was repeated at intervals of 14 days. The decay behavior was regarded as very good if the treatment intensity was at least 37 mN/m after four months ($\Delta B \leq 2$ mN/m). The decay behavior was regarded as poor if the treatment intensity was less than 35 mN/m ($\Delta B \geq 4$ mN/m).

Shrinkage

The longitudinal and transverse shrinkage values are based on the respective increase in length of the film (longitudinally $L_0$ and transversely $Q_0$) before the shrinking process. The longitudinal direction is the machine direction, and the transverse direction is accordingly defined as the direction transverse to the machine direction. The test sample is shrunk in a fan-assisted oven at the respective temperature (90 or 120° C.) for a period of 15 minutes. The permanent elongation of the test sample in the longitudinal and transverse directions is then redetermined ($L_1$ and $Q_1$). The shrinkage is then given as the difference between the elongation determined compared with the original lengths $L_0$ and $Q_0$.

$$\text{Longitudinal shrinkage } L_s = \frac{L_0 - L_1}{L_0}$$

$$\text{Transverse shrinkage } Q_s = \frac{Q_0 - Q_1}{Q_0}$$

This method of determining the longitudinal and transverse shrinkage corresponds to DIN 40 434.

Passage through the machine

The smoothness of passage through the wrapping machine was carried out visually and was assessed as follows:

| | | |
|---|---|---|
| very good (++) | <2% | of the sample packs are faultily wrapped |
| good (+) | 2–6% | of the sample packs are faultily wrapped |
| moderate (±) | 6–12% | of the sample packs are faultily wrapped |
| poor (−) | 12% or more | of the sample packs are faultily wrapped |

Wrap appearance

The wrap appearance and the visual quality of the seal seams were assessed visually.

Example

A three-layer film with an overall thickness of 18 μm was produced by coextrusion and subsequent stepwise orientation in the longitudinal and transverse directions. The top layers had a thickness of 0.6 μm in each case.

Base layer 89.8% by weight of random propylene-ethylene copolymer having an ethylene content of 4.5% by weight, a melting point of $T_M = 137°$ C. and an enthalpy of fusion of $\Delta h_M = 70$ J/g 10.0% by weight of isotactic polypropylene 0.1% by weight of erucamide 0.1% by weight of N, N-bisethoxyalkylamine Top layers 99.8% by weight of a polymer mixture of a $C_2$-$C_3$-$C_4$-terpolymer and a $C_3$-$C_4$-copolymer corresponding to a content of 0.7% by weight of $C_2$ and 81.3% by weight of $C_3$ and 18% by weight of $C_4$, based on the polymer mixture (Tafmer XR 107 LN)

0.2% by weight of $SiO_2$ as antiblocking agent, having a mean particle size of 4 μm The production conditions given in the individual process steps are:

Extrusion

Base layer temperatures: 250° C.

Top layer temperatures: 270° C.
Take-off roll temperature: 30° C.
Longitudinal stretching
Temperature T=100° C.
Longitudinal stretching ratio=6.5
Transverse stretching
Temperature T=140° C.
Transverse stretching ratio=7.3
Convergence 25%
Fixing
Temperature T=60° C.

The film produced in this way has the properties listed in the table. The film was subjected to corona treatment before being rolled up, in order to ensure printability. The surface tension of the film as a consequence of this treatment is 40 mN/m.

|  | Shrinkage [%] 120° C., 15 min | | Shrinkage [%] 90° C., 15 min | | Minimum sealing temperature 10 N/cm$^2$ 0.5 s | | Seal seam strength 10 N/cm$^2$ 0.5 s, 105° C. | | | |
|---|---|---|---|---|---|---|---|---|---|---|
|  | long. | transv. | long. | transv. | A side* | D side** | A side | D side | Gloss | Haze |
| Example | 18 | 22 | 3 | 5 | 88° C. | 100° C. | 2.2 | 2.1 | 105 | 2.5 |

*A side: Film side not subjected to corona treatment
**D side: Film side subjected to corona treatment

What is claimed is:

1. A transparent, coextruded, multilayer polyolefin film which can be heat-sealed at low temperatures, comprising a base layer and at least one heat-sealable top layer on the base layer, wherein
    a) the multilayer film has, at 120° C., a longitudinal shrinkage of greater than 10%, and a transverse shrinkage of greater than 10%;
    b) the multilayer film has, at 90° C., a longitudinal shrinkage of at most 10%, and a transverse shrinkage of at most 10%; and
    c) at least one top layer has a minimum sealing temperature of at most 124° C.

2. A multilayer film as claimed in claim 1, wherein at 120° C. the longitudinal shrinkage is from 15% to 35% and the transverse shrinkage is from 15% to 35%.

3. A multilayer film as claimed in claim 1, wherein at 90° C. the longitudinal shrinkage is from 3% to 8% and the transverse shrinkage is from 2% to 8%.

4. A multilayer film as claimed in claim 1, wherein the minimum sealing temperature is from 75° C. to 110° C.

5. A multilayer film as claimed in claim 1, wherein the base layer comprises a polymer of an α-olefin having 2 to 8 carbon atoms.

6. A multilayer film as claimed in claim 5, wherein the base layer comprises a polymer of propylene.

7. A multilayer film as claimed in claim 6, wherein the base layer comprises one or more of a polypropylene homopolymer, a copolymer of propylene and a further α-olefins having 2 to 8 carbon atoms, or a terpolymer of propylene and further α-olefins having 2 to 8 carbon atoms.

8. A multilayer film as claimed in claim 7, wherein the base layer comprises a mixture of at least two of a polypropylene homopolymer, an ethylene-propylene copolymer, or an ethylene-propylene-butylene terpolymer.

9. A multilayer film as claimed in claim 8, wherein the base layer consists essentially of a mixture of a polypropylene homopolymer with at least one of an ethylene-propylene copolymer and an ethylene-propylene-butylene terpolymer.

10. A multilayer film as claimed in claim 7, wherein the base layer comprises at least 50% by weight, of at least one of an ethylene-propylene copolymer, an ethylene-propylene-butylene terpolymer, and a propylene-butylene copolymer.

11. A multilayer film as claimed in claim 1, wherein the top layer comprises an α-olefin polymer.

12. A multilayer film as claimed in claim 11, wherein the top layer comprises an ethylene-propylene-butylene terpolymer which is optionally admixed with at least one of an ethylene-propylene copolymer, an ethylene-butylene copolymer, and a propylene-butylene copolymer.

13. A multilayer film as claimed in claim 1, wherein the base layer contains a hydrocarbon resin.

14. A multilayer film as claimed in claim 1, wherein the base layer contains erucamide as a lubricant.

15. A multilayer film as claimed in claim 1, wherein the top layer contains an antiblocking agent.

16. A multilayer film as claimed in claim 1, wherein the thickness of the top layer is in the range from 0.1 μm to 4 μm.

17. Packaging comprising a multilayer film as claimed in claim 1.

18. A multilayer film as claimed in claim 1, wherein the base layer comprises an admixture of isotactic polypropylene and a random propylene-ethylene copolymer, and wherein there is a top layer on each side of the base layer, wherein the top layers comprise a mixture of an ethylene/propylene/butylene terpolymer and a propylene/butylene copolymer.

* * * * *